(12) United States Patent
Parkin et al.

(10) Patent No.: US 10,357,925 B2
(45) Date of Patent: Jul. 23, 2019

(54) ENHANCED VOLATILE REMOVAL FOR COMPOSITE LAYUP

(71) Applicant: UNITED TECHNOLOGIES CORPORATION, Farmington, CT (US)

(72) Inventors: Michael Parkin, S. Glastonbury, CT (US); Charles R Watson, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 236 days.

(21) Appl. No.: 15/106,437

(22) PCT Filed: Dec. 16, 2014

(86) PCT No.: PCT/US2014/070508
§ 371 (c)(1),
(2) Date: Jun. 20, 2016

(87) PCT Pub. No.: WO2015/095135
PCT Pub. Date: Jun. 25, 2015

(65) Prior Publication Data
US 2016/0339651 A1 Nov. 24, 2016

Related U.S. Application Data

(60) Provisional application No. 61/918,714, filed on Dec. 20, 2013.

(51) Int. Cl.
*B29C 70/48* (2006.01)
*B29C 70/54* (2006.01)
(Continued)

(52) U.S. Cl.
CPC .......... *B29C 70/547* (2013.01); *B29C 70/086* (2013.01); *B29C 70/342* (2013.01);
(Continued)

(58) Field of Classification Search
CPC ........ B29C 70/70; B29C 70/747; B29C 70/30
See application file for complete search history.

(56) References Cited

U.S. PATENT DOCUMENTS 5,897,739 A 4/1999 Forster et al.
6,311,542 B1 11/2001 Sloman
(Continued)

FOREIGN PATENT DOCUMENTS

WO 95/29807 A1 11/1995

OTHER PUBLICATIONS

European Search Report dated Sep. 13, 2017 for European Patent Application 14871113.8.
(Continued)

*Primary Examiner* — Benjamin A Schiffman
(74) *Attorney, Agent, or Firm* — Bachman & LaPointe, P.C.

(57) ABSTRACT

A composite article lay up comprising a first layer of resin impregnated fiber material and a second layer of resin impregnated fiber material. An open cell material is layered between the first layer and the second layer. The open cell material has no resin during a first stage of a resin cure cycle. The open cell material has passages configured to flow volatiles formed during the first stage of the resin cure cycle. The open cell material is configured to fill with the resin during a second stage of the resin cure cycle. The open cell material is configured to form an integral structure with the first layer and the second layer as part of the composite article at the completion of the resin cure cycle.

14 Claims, 2 Drawing Sheets

(51) Int. Cl.
*B29C 70/68* (2006.01)
*B29C 70/44* (2006.01)
*B32B 5/02* (2006.01)
*B32B 27/28* (2006.01)
*B29C 70/34* (2006.01)
*B29C 70/08* (2006.01)
*B32B 27/06* (2006.01)
*B32B 5/18* (2006.01)
*B32B 5/24* (2006.01)
*B32B 37/00* (2006.01)
*B32B 3/26* (2006.01)
*B29K 79/00* (2006.01)
*B29K 105/08* (2006.01)

(52) U.S. Cl.
CPC ............ *B29C 70/44* (2013.01); *B29C 70/443* (2013.01); *B29C 70/48* (2013.01); *B29C 70/682* (2013.01); *B32B 3/266* (2013.01); *B32B 5/02* (2013.01); *B32B 5/024* (2013.01); *B32B 5/18* (2013.01); *B32B 5/245* (2013.01); *B32B 27/06* (2013.01); *B32B 27/28* (2013.01); *B32B 27/281* (2013.01); *B32B 37/00* (2013.01); *B29K 2079/08* (2013.01); *B29K 2105/0872* (2013.01); *B29K 2715/003* (2013.01); *B32B 2250/40* (2013.01); *B32B 2260/021* (2013.01); *B32B 2260/023* (2013.01); *B32B 2260/046* (2013.01); *B32B 2266/06* (2013.01)

(56) References Cited

U.S. PATENT DOCUMENTS

| | | | |
|---|---|---|---|
| 6,861,017 B1 * | 3/2005 | McCarville | B29C 33/10 264/102 |
| 2004/0146696 A1 | 7/2004 | Jones | |
| 2006/0191624 A1 | 8/2006 | Whitworth et al. | |
| 2007/0274835 A1 | 11/2007 | Stiesdal | |
| 2010/0098906 A1 | 4/2010 | Bongiovanni et al. | |
| 2010/0098927 A1 | 4/2010 | Boyd et al. | |
| 2011/0027095 A1 | 2/2011 | Jensen | |
| 2011/0209812 A1 | 9/2011 | Bansal et al. | |

OTHER PUBLICATIONS

International Search Report for PCT/US2014/070508 dated Mar. 17, 2015.

* cited by examiner

ENHANCED VOLATILE REMOVAL FOR COMPOSITE LAYUP

CROSS REFERENCE TO RELATED APPLICATION

This application claims the benefit of provisional application Ser. No. 61/918,714, filed Dec. 20, 2013, titled Enhanced Volatile Removal for Composite Layup.

BACKGROUND

The disclosure relates to a method and system of manufacturing a composite article. More particularly, the disclosure relates to removal of volatiles produced during composite laminate production.

Currently many methods of manufacturing a molded fiber reinforced, resin based, composite article, involves combining a liquid, or solid resin with a strong fibrous reinforcement. The combined materials can be cured and converted into a structural composite article by the application of thermal energy and pressure.

One such method of manufacturing the composite article is by use of vacuum bag processing. Laid up layers of fibrous material and resin are placed on an impervious mold and covered by an impermeable membrane sealed at its edges. The sealed assembly is heated to temperatures between about 135 degrees Celsius (275 F) to about 365 degrees Celsius (700 F). The combination of pressure and temperature provides the necessary conditions to promote resin flow and coalesce individual layers together and cure the resin. As the resin is cured, volatiles are produced.

A vacuum is applied inside the assembly during portions of the cure cycle to draw off the volatiles. A porous fabric is used proximate to the impermeable membrane and exterior to the article being cured to allow for a gaseous flow path for the volatiles to escape.

However, the volatiles such as water and alcohols in gaseous/vapor form and can get trapped inside the resin matrix or between layers of the composite article before being removed. The gases that get trapped form voids in the resin or between the layers. The voids formed in the composite article compromise the mechanical properties of the composite article. Delamination of the composite article may also result from the failure to remove the volatiles during production.

The compromised mechanical properties due to voids in the composite article results in large scrap rates during production. The large scrap rates are costly.

What is needed is an improved method for manufacturing composite articles whereby volatiles and other gases created during the process are removed.

SUMMARY

One aspect of the disclosure involves a composite article lay up comprising a first layer of resin impregnated fiber material and a second layer of resin impregnated fiber material. An open cell material is layered between the first layer and the second layer. The open cell material has no resin during a first stage of a resin cure cycle. The open cell material has passages configured to flow volatiles formed during the first stage of the resin cure cycle. The open cell material is configured to fill with the resin during a second stage of the resin cure cycle. The open cell material is configured to form an integral structure with the first layer and the second layer as part of the composite article at the completion of the resin cure cycle.

In an exemplary embodiment, at least one pattern is formed by the open cell material in the composite article. The pattern is configured to flow the volatiles from a first portion of the composite article to a second portion of the composite article to evacuate the volatiles out of the composite article. The pattern reduces the resistance to flow of the volatiles from within the composite article to an exit of the composite article.

In an exemplary embodiment, a method is disclosed including forming a laminate of fabric impregnated with resin. The method includes layering an open cell material in the absence of the resin within at least one layer of the laminate to form a composite article layup. The method includes encapsulating the composite article layup in a vacuum device to facilitate removal of volatiles from the composite article layup. The volatiles are vaporized from the resin. The method includes transporting the volatiles through the open cell material from the resin away from the composite article layup. The resin is flowed into the open cell material. The method includes filling open cells of the open cell material with resin after the volatiles have transported through the open cell material out of the vacuum device. The method includes consolidating the resin and the fabric and the open cell material. The method includes curing the resin in the composite article layup.

In various implementations, the method also includes applying a compaction vacuum to the composite article layup in the vacuum device. The method also includes degassing the resin in said composite article layup. The resin comprises a polyimide material. The method includes forming transport passages through the open cell material from the resin to an exterior of the composite article layup. The transport passages are formed in a predetermined pattern from a first location proximate the resin within the laminate to a second location proximate an outlet of the vacuum device. Layering the open cell material includes placing layers of open cell material between plies of the fabric. The pattern is selected from the group consisting of a strip, lattice, or sheet.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
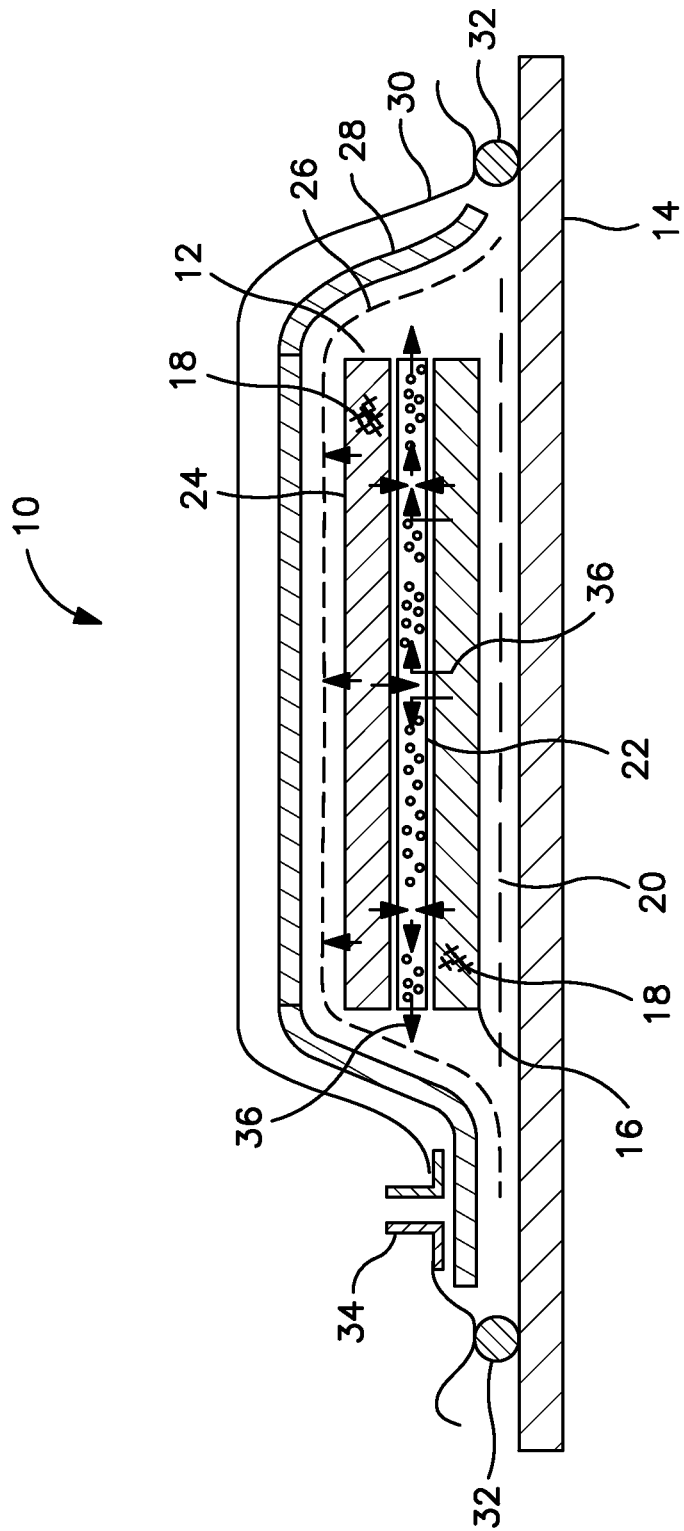
FIG. 1 is a partial cross-section schematic of a composite article lay up.

FIG. 1 shows a vacuum manufacturing assembly layup or assembly 10 for forming a composite article 12. The assembly 10 includes a base plate tool 14 that forms a shape or mold for the composite article 12. The plate 14 is rigid and impermeable and forms an air tight portion of the assembly 10. A laminate of fabric impregnated with resin or first layer 16 impregnated with resin 18 of the composite article 12 is positioned on the plate 14. A permeable fabric sheet 20 can be placed between the first layer 16 and the plate 14. An open cell material 22 made up of a porous media is laid onto the first layer 16. A second layer impregnated with resin 18 is positioned over the open cell material 22 to form the composite article 12. A release membrane 26 can be used in the manufacturing assembly 10. The release membrane 26 can be laid over the composite article 12 to allow for gases to pass through while preventing the flow of liquids past the membrane 26. A breather layer 28 covers the composite article 12 and provides open passages for gases to escape from the exterior of the composite article 12. An impermeable vacuum sheet 30 is situated over the breather layer 28 and on top of the composite article 12. The sheet 30 is sealed to the base plate 14 via sealant 32 such that there is no infiltration of exterior atmosphere and so that a vacuum can be pulled within the space formed between the vacuum sheet 30 and base plate 14 for the purpose of removing any gases formed during the resin 18 cure. A vacuum coupling 34 is attached to the impermeable vacuum sheet 30 and configured to attach to a vacuum device (not shown) for drawing a vacuum inside the space covered by the vacuum sheet 30.

During the process of manufacturing the composite article 12, the resin 18, impregnated in the first layer 16 and the second layer 24 of the composite article 12, is heated and undergoes distinct steps of curing before forming into the finished composite article 12. The resin 18 is heated to a point that allows for volatile materials to change phase into a gas or vapor. The resin produces water vapor and gases including gaseous alcohol and the like, known as volatiles 36 and shown as arrows. The volatiles 36 are drawn out of the composite article 12 due to the vacuum applied to the vacuum manufacturing assembly 10. As discussed earlier above, the volatiles may be trapped in the first and second layers' resin 18 and may form voids (not shown) in the composite article 12.

In an exemplary embodiment, with a resin 18 of polyimide, during cure the preimpregnated reinforcement material releases the solvent used to preimpregnate the layers 16, 24. In a typical release up to about 8 weight percent of material is released. The solvent is usually alcohol, such as ethanol or methanol for a polyimide. Other solvent, such as methyl ethyl ketone, acetone and methylene chloride have been used or made present as volatile impurities in the resin 18 manufacturing process. The resin monomers react to form the cured or vitrified resin and release water and alcohol, typically ethanol or methanol, as a product of reaction.

The composite article 12 illustrated herein, is not subjected to the same problems caused by the formation of voids by the volatiles 36. The unique structure of the open cell material 22 allows for the evacuation of the volatiles 36 from within the structure of the composite article 12. The nature of the open cell material 22 creates multiple passages capable of permitting the flow of gases and vapor through the open cell material 22 and out of the composite article 12. The open cell material 22 is laid out between the first layer 16 and the second layer 24 in a fashion that allows for transport of the volatiles 36 from within the composite article 12 along the plane of the open cell material 22 in a lateral direction. In an exemplary embodiment, the volatiles 36 can flow in the plane of the laminate structure of the composite article 12 as well as through the plane in the transverse direction. The size and location of the pockets and open cells of the open cell material 22 allow for the evacuation of the volatiles 36 via shorter pathways out of the layers 16, 24.

The open cell material 22 can include an Astroquartz™ scrim, braided tubes, filaments and the like. The open cell material 22 in another embodiment can be made of other fibers such as E glass and S glass. The open cell material 22 can be placed in layers between the plies of the composite article 12. The open cell material 22 can be placed in any variety of alternating combinations between the layers of the composite article 12. The open cell material 22 can be laid out in whole sheets, in strips, as braided tubes, in crossed lattice patterns, and the like.

The open cell material 22 allows for resin 18 to fill in the open cells at the proper time in the curing process. Ultimately, creating a strong integral structure without voids. The open cell material 22 remains stable at the elevated temperatures required to cure the resin 18 in the layers 16, 24. The open cell material 22 allow the volatiles 36 to escape early in the cure cycle. When the resin 18 flows during the cure cycle, the open cell material 22 becomes filled with resin 18 at a later stage of the cure cycle after the volatiles have been removed. Ultimately as the resin 18 that has filled the open cell material 22 cures completely, the open cell material 22 becomes solid and part of the composite article 12. The resin 18 filled open cell material 22 has the same material properties as the other portions of the composite article 12.

The resin 18 can be a polyimide resin, which can be a mixture of suitable aromatic diamine(s), the half ester of suitable aromatic half ester, such as, the phenyl ethynyl group. During the curing reaction the solvent used in the prepregnation operation is removed by heat and vacuum. The aromatic amine and the half esters from the tetraacid and the end cap initially react to form amic acid, which then further react to form an imidized molecule with up to approximately ten repeat units. Imidization is essentially complete at approximately 175 degrees Celsius. The imidized resin is further heated under vacuum and held at a temperature where the resin undergoes a melt with minimal crosslinking at about 225 degrees Celsius to about 315 degrees Celsius. The melt facilitates the reaction of unreacted materials and allows for the removal of remaining volatiles. The assembly 10 can be heated at a temperature sufficient to cause the endcap groups of the resin to react by an addition reaction with no volatile byproducts). The cured assembly 10 lay up is then cooled and removed from the base plate tool 14 and the processing materials removed.

Figure 2:
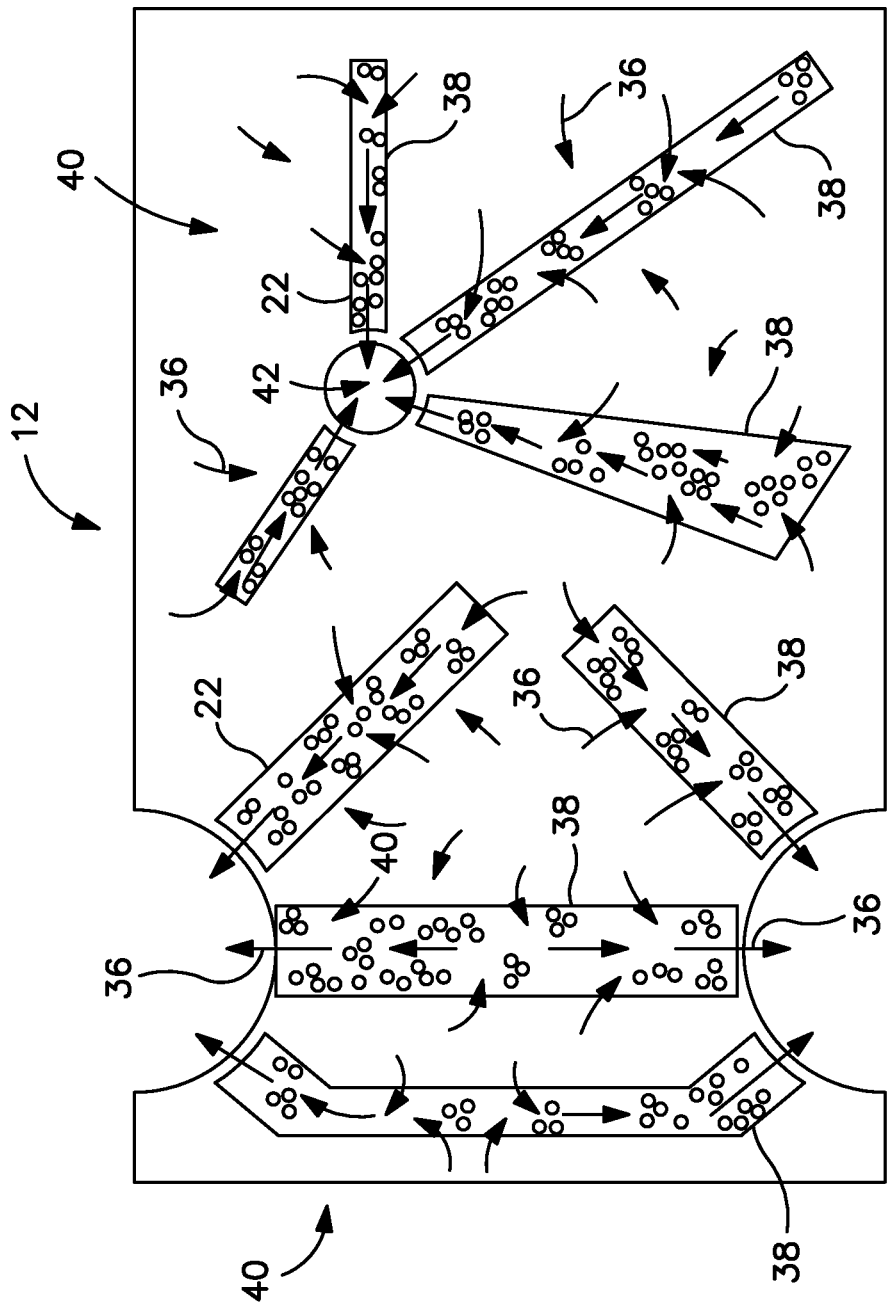
FIG. 2 is a plan view schematic of a composite article lay up.

The exemplary embodiment in FIG. 2 includes a composite article 12 with multiple pathways 38 formed by use of the open cell material 22. In some composite article 12 designs, the size, shape and form of the composite article 12 create intrinsically long and difficult to vent and degas areas of the composite article 12 during the manufacturing process. The areas that are difficult to remove the volatiles 36 (shown as arrows) can be more prone to void formation due to trapped volatiles 36 in the layers 16, 24 during the curing process. The addition of the open cell material 22 in patterns 40 that extend from areas that may not vent volatiles 36 well to areas that have better volatile 36 removal properties, such as holes or open portions 42 in the composite article 12 or sections that are open, allows for the volatiles 36 to be removed early in the cure cycle as described above. The volatiles 36 are less likely to be trapped and cause voids. The patterns 40 of the open cell material 22 can shorten the pathways for the volatiles 36 to escape and be removed during degassing phases of manufacturing. When the vacuum is applied to the manufacturing assembly 10, the volatiles 36 flow through passages of the open cell material 22 exiting the composite article 12 and being evacuated from the assembly 10. The patterns 40 can include shapes and sizes that maximize the removal of volatiles 36 from the layers 16, 24 including sheets, strips, lattice and the like.

The patterns 40 made of the open cell material 22 are configured to be open to the flow of the volatiles 36 during the degassing phase of the resin curing. The patterns 40 are configured to be filled with resin 18 after degassing and allow for the resin 18 to flow into the open voids and ultimately fill the open cell material 22 and form as an integral structure with the layers 16, 24 in the composite article 12.

One or more embodiments have been described. Nevertheless, it will be understood that various modifications may be made. For example, the open cell material 22 can consist of various alternate fibers. Accordingly, other embodiments are within the scope of the following claims.

What is claimed is:

1. A method comprising:
    forming a laminate of fabric impregnated with resin;
    layering an open cell material in the absence of said resin within at least one layer of said laminate to form a composite article layup; wherein layering said open cell material includes placing layers of open cell material between plies of said fabric;
    encapsulating said composite article lay up in a vacuum device to facilitate removal of volatiles from said composite article layup;
    vaporizing volatiles from said resin;
    transporting said volatiles through said open cell material from said resin away from said composite article layup;
    flowing said resin into said open cell material;
    filling open cells of said open cell material with resin after said volatiles have transported through said open cell material out of said vacuum device;
    consolidating said resin and said fabric and said open cell material; and
    curing said resin in said composite article layup.

2. The method of claim 1, further comprising:
    applying a compaction vacuum to said composite article layup in said vacuum device.

3. The method of claim 1, further comprising:
    degassing said resin in said composite article layup.

4. The method of claim 1 wherein said resin comprises a polyimide material.

5. The method of claim 1 further comprising:
    forming transport passages through said open cell material from said resin to an exterior of said composite article layup.

6. The method of claim 5 wherein said transport passages are formed in a predetermined pattern from a first location proximate said resin within said laminate to a second location proximate an outlet of said vacuum device.

7. The method of claim 1 wherein said open cell material comprises a braided tube.

8. A method comprising:
    forming a laminate of fabric impregnated with resin;
    layering an open cell material in the absence of said resin within at least one layer of said laminate to form a composite article layup; wherein said open cell material comprises a braided tube;
    encapsulating said composite article lay up in a vacuum device to facilitate removal of volatiles from said composite article layup;
    vaporizing volatiles from said resin;
    transporting said volatiles through said open cell material from said resin away from said composite article layup;
    flowing said resin into said open cell material;
    filling open cells of said open cell material with resin after said volatiles have transported through said open cell material out of said vacuum device;
    consolidating said resin and said fabric and said open cell material; and
    curing said resin in said composite article layup.

9. The method of claim 8, further comprising:
    applying a compaction vacuum to said composite article layup in said vacuum device.

10. The method of claim 8, further comprising:
    degassing said resin in said composite article layup.

11. The method of claim 8 wherein said resin comprises a polyimide material.

12. The method of claim 8 further comprising:
    forming transport passages through said open cell material from said resin to an exterior of said composite article layup.

13. The method of claim 12 wherein said transport passages are formed in a predetermined pattern from a first location proximate said resin within said laminate to a second location proximate an outlet of said vacuum device.

14. The method of claim 8 wherein layering said open cell material includes placing layers of open cell material between plies of said fabric.

* * * * *